(No Model.)

S. PINOVER.
LACE PIN AND OTHER SIMILAR FASTENINGS.

No. 314,471. Patented Mar. 24, 1885.

Attest:
G. M. Graham
A. F. Jasbera

Inventor:
Samuel Pinover,
By atty.
Jacob Felbel.

UNITED STATES PATENT OFFICE.

SAMUEL PINOVER, OF NEW YORK, N. Y., ASSIGNOR TO A. PINOVER & CO., OF SAME PLACE.

LACE-PIN AND OTHER SIMILAR FASTENINGS.

SPECIFICATION forming part of Letters Patent No. 314,471, dated March 24, 1885.

Application filed July 30, 1884. (No model.)

*To all whom it may concern:*

Be it known that I, SAMUEL PINOVER, of the city, county, and State of New York, have invented certain new and useful Improvements in Lace-Pins and other Similar Fastenings; and I do hereby declare that the following is a full, clear, and exact description of the same, reference being had to the accompanying drawings, forming part thereof.

My invention relates to certain new and useful improvements in brooches, lace-pins, and other similar dress fastenings and ornaments. Previous to my invention such articles have been provided with safety catches or devices operating to render difficult or impossible the accidental unhooking of the usually-employed pin; but the constructions involved have all, so far as my knowledge extends, been complex in details, difficult of manipulation, and costly of manufacture, or have been ineffectual in use.

My invention has for its main objects the production of a lace-pin or other analogous fastening or ornament which shall possess auxiliary means to prevent or lessen the liability of casual or accidental unfastening of the pin proper, and which shall be simple and cheap in construction and easy and effective in operation; and to these ends my invention consists in certain features of construction and combinations of devices which I shall presently proceed to describe in connection with the drawings, and which will be found set forth in the claims following the general description and mode of operation.

Figure 1:
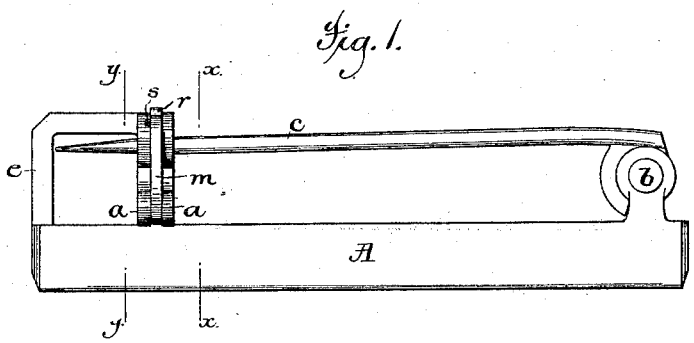
Figure 2:
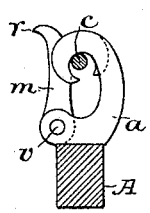
Figure 3:
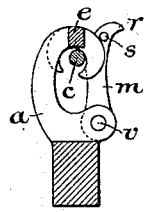
Figure 4:
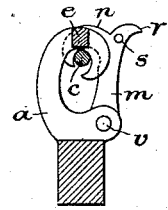
Figure 5:
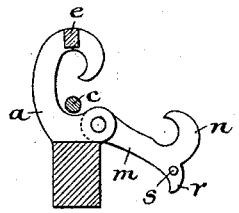
Figure 6:
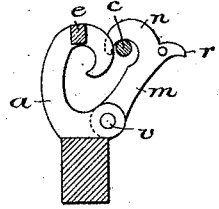

In the accompanying drawings, Figure 1 is a top view, on an enlarged scale, of an ordinary lace or breast pin having my invention applied thereto. Fig. 2 is a transverse vertical section thereof, taken at the line $x\ x$, and looking toward the left. Fig. 3 is a similar section taken at the line $y\ y$ of Fig. 1, and looking toward the right. Fig. 4 is a similar section taken at the same line as the last-mentioned figure, and looking in the same direction, but showing the pivoted hooked arm in a different position relatively to the fixed hook or catch. Fig. 5 is a like section at the line $y\ y$ of Fig. 1, and looking toward the right, but showing the pin in a different place within the stationary hook and the swinging hooked arm thrown back to permit the unhooking of the pin. Fig. 6 is a similar section looking in the same direction, but showing the pin and hooked arm in different positions and in engagement.

In the various views the same parts will be found designated by the same letters of reference.

A is the bar or base of the pin, which may be of any selected material, size, or contour, or of any desired design or ornamentation. To the rear side of this bar, at one end, is fastened, by the usual hinge-joint, $b$, one end of the pin proper, and preferably near the other end of said bar is located, on the rear side, a fixed C-shaped hook or catch, $a$, with which the free end of the pin $c$ engages, all in about the customary manner.

Projecting rearwardly of the bar A, at the extremity of the pin near which the catch is situated, is a frame-work or bracket, $e$, that extends first at right angles to the bar, and then runs about parallel with it. The particular functions of this device are, first, to shield the pointed end of the pin, which, when in use, rests directly against or close to the inner surfaces of the bracket; and, second, to support the C-shaped hook to which it is secured, or of which it forms an integral part. By guarding the pointed or free end of the pin two desiderata are obtained: first, protection against pricking the fingers or the chin or neck of the wearer, and, secondly, a lessening of the liability of the pin to be displaced, since any force which would otherwise operate at this point to move the pin toward the opening in the catch would be met and resisted by the bracket, with which it would first have to come in contact.

The catch $a$, I make by preference C-shaped, and of a bifurcated or divided form, to protect the hooked arm and afford a broad bearing for the pin, and preferably between the two branches and at the portions next the bar A. I pivot an arm, $m$, which is provided at its extremity with a hook, $n$, that is disposed in a direction opposite to that in which runs the hook of the stationary catch, for a purpose to be hereinafter more fully explained. The office of this arm $m$, when in use, is to close the opening or throat of the C-shaped hook, so that should the pin accidentally be moved opposite to that point the arm will be a bar to its exit from the catch.

In addition to the hook $n$ at the end, the pivoted arm is provided with a finger-piece, $r$, for convenient manipulation, and with a projection or stop, $s$, to limit the vibratory movements of the arm toward the pin.

Taken in connection with the foregoing description of the construction, the following explanation of its mode of operation will suffice to enable any one skilled in the art to which my invention relates to make and use a lace-pin or analogous device embodying my invention.

Let us suppose the article to be in hand and the pin $c$ out of engagement with the catch $a$, and the pivoted arm swung back to the position represented at Fig. 5. While in this condition the article is ready for use, and the pin $c$ may, as usual, be passed through the fabric to which it is to be fastened, and the free end thereof pressed down and guided or led through the throat of the catch $a$. Upon being released by the fingers the pin will spring backwardly within the catch and come to a bearing against its interior surface, as well as against the inner face of the bracket $e$, as shown in Fig. 1. The pivoted arm is now vibrated toward the pin $c$ until the stop $s$ strikes the catch $a$, and is made to close the opening or throat in the fixed hook or catch $a$, (or to obstruct the path in which the pin must move to be freed from the catch.) As the pivot-pin $v$, on which the arm turns, is fitted snugly in an eye in the arm, there is sufficient friction of the parts at this locality to ordinarily keep the pin within the catch should it get forward to the throat of the hook and press to get out. But to further provide against the pin's exit from the catch by accident, I have added to the free extremity of the arm the hook or claw $n$, whose purpose and operation I will now more fully explain. When the arm $m$ is vibrated to close the opening in the catch $a$, the point of the hook $n$ first strikes the pin $c$, and then, as it is moved onward, forces the pin, against its natural spring, forward and down within the catch until the hook shall have traveled its full distance, and the projection $s$ come to a stop against the exterior of the catch $a$, whereupon the pin, by its resiliency, will bound back against the hook of the catch and the parts will be in about the positions illustrated at Fig. 3. The arm $m$ is then turned backward (or away from the pin) by means of the thumb-piece $r$ until the point of the hook $n$ comes hard in contact with the pin $c$, as shown in Fig. 4, from which figure it will be seen that the hook of the stationary catch and the hook of the vibrating arm grasp the pin on opposite sides and leave an opening between their points too small for the pin to get through, and hence there is no likelihood of the pin becoming unfastened while the parts are in the relative positions shown in the last-mentioned figure. It will furthermore be apparent from this figure that it is impossible to designedly turn the arm back to open the throat of the catch, and that any effort in this direction will only more tightly clasp or bind the pin between the oppositely-disposed hooks.

In order to unfasten the article, first move the hook $n$ away from the pin by pushing the arm in to the position shown at Fig. 3. Then, as the opening between the points of the two hooks is greater than the diameter of the pin, press down the pin within the catch to a point below the arc in which the point of the hook $n$ vibrates, (say to the throat of the catch,) and then throw back the arm $m$, so as to open the throat of the catch, (see Fig. 5,) and the pin $c$ may be readily unhooked and the article removed from the scarf or dress of the wearer.

If during use and through accident the arm should get into the position shown at Fig. 3, and the pin should get down to the opening in the catch and press hard enough to vibrate the arm, (which is a very remote contingency,) it would immediately fly up along the inner face of the arm and be caught by the hook $n$, as seen in Fig. 6.

It will be understood, of course, that in lieu of the forms shown of pivoted arm and stationary catch other forms may be applied without departing from the spirit of my invention. For example, the pivoted arm may be in the form of a C-shaped device, and the stationary catch, instead of being bifurcated, may be made solid and the arm pivoted on either side thereof, and it will also be understood that some of the parts of my invention may be used without all of them.

I claim—

1. In a breastpin or analogous fastening, the combination, with the catch and the pin, of an arm pivoted at the root of the catch and at its front, and vibrating in a plane coincident with that in which lies the catch, as and for the purpose set forth.

2. In a breastpin or analogous fastening, the combination, with the bifurcated catch and the pin, of an arm pivoted at the root of the catch, so as to close the opening of the catch, as and for the purpose set forth.

3. In a breastpin or analogous fastening, the combination, with the catch and the pin, of an arm pivoted at the root of the catch and provided with a stop, as and for the purpose set forth.

4. In a breastpin or analogous fastening, the combination, with the catch and the pin, of an arm pivoted at the root and at the front of the catch, to vibrate transversely of the bar or base, and provided with a finger-piece, as and for the purpose set forth.

5. In a breastpin or analogous fastening, the combination, with the catch and the pin, of an arm pivoted at the root of the catch and provided with a hook, as and for the purpose set forth.

6. In a breastpin or analogous fastening, the combination, with the catch and the pin, of an arm pivoted at the root of the catch and provided with a stop, a finger-piece, and a hook, as set forth.

7. A breastpin or analogous fastening comprising the main bar or base, the hinged pin, the bracket, the fixed catch, and the arm pivoted at the root and at the front of the catch, as set forth.

In testimony whereof I have hereunto set my hand this 28th day of July, 1884.

SAMUEL PINOVER.

In presence of—
 DANL. H. LITTLE,
 JACOB FELBEL.